(12) United States Patent
Ghosh et al.

(10) Patent No.: US 11,376,576 B2
(45) Date of Patent: Jul. 5, 2022

(54) METAL CATALYST, METHOD OF C—N COUPLING USING THE SAME AND APPLICATIONS OF THE SAME

(71) Applicant: BOARD OF TRUSTEES OF THE UNIVERSITY OF ARKANSAS, Little Rock, AR (US)

(72) Inventors: Anindya Ghosh, Little Rock, AR (US); Andrew L. Brandt, Little Rock, AR (US); Charlette Parnell, Alexander, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 17/148,736

(22) Filed: Jan. 14, 2021

(65) Prior Publication Data

US 2021/0129123 A1 May 6, 2021

Related U.S. Application Data

(62) Division of application No. 16/054,181, filed on Aug. 3, 2018, now abandoned.
(Continued)

(51) Int. Cl.
*B01J 31/18* (2006.01)

(52) U.S. Cl.
CPC ......... *B01J 31/181* (2013.01); *B01J 31/1805* (2013.01); *B01J 2231/4283* (2013.01);
(Continued)

(58) Field of Classification Search
None
See application file for complete search history.

(56) References Cited

PUBLICATIONS

Gartia et al. Catalysis Letters, 144(3), 507-515 (Year: 2014).*

* cited by examiner

*Primary Examiner* — Yun Qian
(74) *Attorney, Agent, or Firm* — Locke Lord LLP; Tim Tingkang Xia, Esq.

(57) ABSTRACT

A method for C—H bond activation and/or C—N coupling reaction comprises using a metal catalyst to catalyze the C—H bond activation and/or C—N coupling reaction; wherein the metal catalyst represented by the following formula a metal catalyst for C—H bond activation and/or C—N coupling reaction, and a method using the same and application thereof. Specifically, a metal catalyst represented by the following formula:

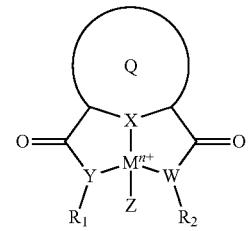

(Formula I)

wherein
Q is a 5 or 6 membered aromatic ring;
W, X, and Y are the same or different, and are independently N, S, P, or O;
M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

9 Claims, 1 Drawing Sheet

Related U.S. Application Data

(60) Provisional application No. 62/540,770, filed on Aug. 3, 2017.

(52) U.S. Cl.
CPC .... *B01J 2231/46* (2013.01); *B01J 2531/0238* (2013.01); *B01J 2531/16* (2013.01); *B01J 2531/62* (2013.01); *B01J 2531/72* (2013.01); *B01J 2531/82* (2013.01); *B01J 2531/824* (2013.01); *B01J 2531/828* (2013.01); *B01J 2531/84* (2013.01); *B01J 2531/842* (2013.01); *B01J 2531/845* (2013.01); *B01J 2531/847* (2013.01)

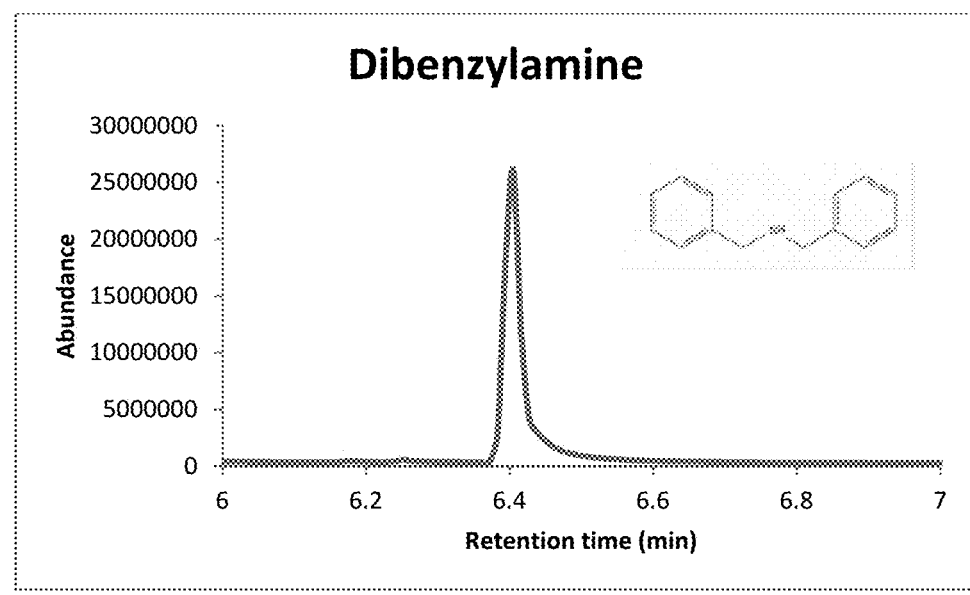

METAL CATALYST, METHOD OF C—N COUPLING USING THE SAME AND APPLICATIONS OF THE SAME

CROSS-REFERENCE TO RELATED PATENT APPLICATIONS

This application is a divisional application of U.S. patent application Ser. No. 16/054,181, filed Aug. 3, 2018, which claims priority to and the benefit of U.S. Provisional Patent Application Ser. No. 62/540,770, filed Aug. 3, 2017, which are incorporated herein in their entireties by reference.

FIELD OF THE INVENTION

The present disclosure relates to a metal catalyst, a method of C—N coupling using a metal catalyst and applications of the same. In certain embodiments, a metal catalyst with varying substituents is used for direct coupling of primary and secondary amines with hydrocarbons containing activated and non-activated C—H bonds ($sp^3$ carbon).

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Nitrogen-based compounds have great value in various fields ranging from fine chemicals to pharmaceuticals. In particular, aromatic nitrogen-based compounds have even more great value, extending to even more fields such as agrochemicals, electronica materials, xerography, pigmentation, and photography. Because of their diverse uses, developing a cheap and easy to use methodology for C—N coupling has become an area of great importance.

In the past several decades, great strides have been made by both Buchwald and Hartwig in the area of C—N coupling. However, in their cases, they use palladium-based catalysts and bases in order to perform reactions, which lead to relatively good turnovers but also produced undesirable side products. Apart from palladium, other expensive metals, e.g. rhodium, have also been employed for C—N coupling.

A plethora of metals have been used to enhance C—H activation. In many cases, C—H activation is facilitated by a nucleophilic nitrogen and a leaving group that is used to enhance facile C—N bond formation. However, a M-N bond, where M is a metal, is quite nucleophilic in itself, making the formation of a C—N bond difficult. As a result, readjusting the reactivity of the nitrogen atom has become a heavy field of interest. Many research groups have attempted to make the nitrogen atom become electrophilic but this also has many drawbacks. One such drawback is atom economy. When adjusting the reactivity of normally nucleophilic nitrogen, pre-synthetic steps are taken, such as forming bonds between nitrogen and halogens or carboxylic acids. This increase in steps, however, is undesirable on a large scale. Therefore, although this avenue opens many doors, it is also not ideal. See M. L. Louillat and F. W. Patureau, Chem. Soc. Rev. 2014, 43, 901.

Palladium salts have been used to achieve excellent C—N coupling. In general, palladium catalysts require low loads of around 2-5 mol %. They also require low base or oxidants that are normally a 2:1 ratio of base/oxidant to palladium catalyst. Good yields have also been isolated with no preference for electron rich or electron deficient systems. For example, some research groups have used palladium catalysts to couple arylamines with different types of vinyl halides and pseudohalides with good yields under mild conditions. Other research groups have shown high regioselectivity of palladium catalysts and good yields under mild to harsh reaction conditions in short time intervals. See J. Bariwal and E. V. d. Eycken, Chem. Soc. Rev. 2013, 42, 9283.

Recently, other research groups have started to divert their attention from using palladium-based catalysts toward inexpensive metal-based catalysts such as nickel and copper. Copper catalysts were first utilized by Ullmann and Goldberg over a century ago but not until recently was copper used extensively in synthetic chemistry for C—N coupling. Copper catalyst with and without oxidants and in the presence of base have been on the forefront of C—N coupling for the past several decades. Their reactivity is slightly weaker than palladium leading to 10-20 mol % requirements and matching base or oxidant amounts. There have also been reports of other metals, such as aluminum and silver, showing excellent catalytic properties under interesting conditions. For example, aluminum has shown relatively efficient turnovers for carboxylic groups into amides. Silver catalysts have shown good yields almost instantaneously. See M. L. Louillat and F. W. Patureau, Chem. Soc. Rev. 2014, 43, 901; J. F. Hartwig, Angew. Chem. Int. Ed. 1998, 37, 2046.

U.S. Pat. No. 8,952,198 disclosed a process for the preparation of an amine (particularly diamines and polyamines) by reacting an alkanolamine or a polyol with ammonia in the presence of a catalyst composed of two active metals from the group of transition metals, namely nickel and chromium supported on a microporous refractory substrate, in a hydrogenated, trickle bed reactor. U.S. Pat. No. 5,608,113 relates to a zirconium, copper, nickel catalyst, the catalytically active composition comprises from 20 to 85% by weight of oxygen-containing zirconium compounds, calculated as $ZrO_2$, from 1 to 30% by weight of oxygen-containing compounds of copper, calculated as CuO, from 30 to 70% by weight of oxygen-containing compounds of nickel, calculated as NiO, from 0.1 to 5% by weight of oxygen-containing compounds of molybdenum, calculated as $MoO_3$, and from 0 to 10% by weight of oxygen-containing compounds of aluminum and/or manganese, calculated as $Al_2O_3$ and $MnO_2$. EP 0039918 discloses catalytic amination process for the production of amines using alumino silicate catalyst at a temperature ranging from 200°-500° C. and a pressure of from 300-6.000 psi. However, these catalysts require multiple metals, have limited applications, and/or require special reaction conditions.

Therefore, there is still need to reduce the catalyst loading, to reduce the use or amount of base or oxidants in performing C—N bond formation, and to reduce extra steps required such as incorporation of additional groups ideal for directing C—N bond formation.

SUMMARY OF THE INVENTION

The present disclosure relates to a metal catalyst for C—H bond activation and/or C—N coupling reaction, and a method using the same and application thereof.

Certain aspects of the present disclosure are directed to a metal catalyst represented by the following formula:

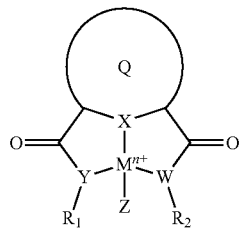

(Formula I)

wherein

Q is a 5 or 6 membered aromatic ring;
W, X, and Y are the same or different, and are independently N, S, P, or O;
M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

In one aspect, the present disclosure are directed to the present disclosure are directed to a metal catalyst represented by the following formula:

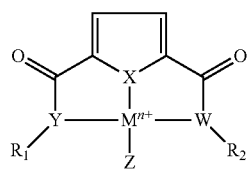

(Formula II)

wherein

W, X, and Y are the same or different, and are independently N, S, P, or O;
M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

In one aspect, the present disclosure are directed to a metal catalyst represented by the following formula:

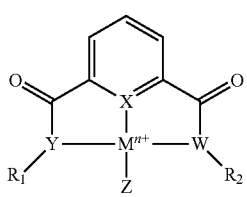

(Formula III)

wherein

W, X, and Y are the same or different, and are independently N, S, or P;
M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

In certain embodiments, W, X, and Y in each of the Formula I, II, and III are the same. In certain embodiments, W, X, and Y are nitrogen (N).

In one aspect, the present disclosure are directed to the method for C—H bond activation and/or C—N coupling reaction using the metal catalyst represented by Formula I, II, or III. In certain embodiments, the reaction is performed under ambient and mild conditions. In certain embodiments, the reaction is performed without the presence of an oxidant or a base.

In certain embodiments, the present disclosure are directed to the method for C—H bond activation and/or C—N coupling reaction using the metal catalyst represented by Formula I, II, or III, and the C—N coupling reaction forms C—N bonds between a $sp^3$ carbon and a primary or secondary amine to form substituted or an alkylated amine. In certain embodiments, the $sp^3$ carbon is an aliphatic and aromatic hydrocarbon.

In certain embodiments, the present disclosure are directed to the method for C—H bond activation and/or C—N coupling reaction using the metal catalyst represented by Formula I, II, or III, and the C—N coupling reaction can be used to form aliphatic or aromatic amines using primary or secondary amines and form cyclic amine or oligomeric compound using aliphatic amines.

In one aspect, the present disclosure are directed to the method for C—H bond activation and/or C—N coupling reaction using the metal catalyst represented by Formula I, II, or III with the presence of an oxidant or a base. In certain embodiments, the oxidant and/or the base increase the yields of aliphatic and aromatic C—N coupling reaction. In certain embodiments, the oxidant can be selected from, for example, oxygen, hydrogen peroxide, t-butylhydroperoxide, peracetic acid, m-chloroperbenzoic acid, iodosylbenzene, phenyliododiacetate, iodine, sodium perborate, sodium hypochlorite, sodium persulfate, potassium persulfate, pyridine N-oxide, dibromoethane, manganese dioxide, cerium oxide, or sodium percarbonate, and combination thereof. In one particular embodiment, the metal is Zr. In another embodiment, the oxidant is pyridine N-oxide. In certain embodiments, the oxidant and/or the base increase the yields of aliphatic and aromatic C—N coupling reaction. In certain embodiments, the base can be selected from, for example, sodium carbonate, potassium carbonate, calcium carbonate, sodium tert-butoxide, potassium tert-butoxide, calcium tert-butoxide, sodium hydride, potassium hydride, or calcium hydride and combination thereof.

In one aspect, the amount of the metal catalyst represented by Formula I, II, or III in a reaction is not particular limited, for example, in the range of 0.0001-10 mol %. In one embodiment, the amount of the metal catalyst represented by Formula I, II, or HI in a reaction is 0.02-2 mol %.

Further aspects, features, and advantages of the present disclosure will be apparent to those of ordinary skill in the art upon examining and reading the following Detailed Description of the Preferred Embodiments.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which:

FIG. 1 illustrates a GC-MS chromatogram of dibenzylamine.

DETAILED DESCRIPTION OF THE INVENTION

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures, and other references mentioned herein are expressly incorporated by reference in their entirety.

The present description provides a metal catalyst for C—H bond activation and/or C—N coupling reaction, and a method using the same and application thereof.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range, and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one o" "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "alkyl" or prefix "alkyl-", and the like refers to both straight and branched chain hydrocarbons containing 1 to 8 carbons, and the terms "alkyl" and "alk" as employed herein alone or as part of another group includes both straight and branched chain hydrocarbons containing 1 to 20 carbons, preferably 1 to 10 carbons, more preferably 1 to 8 carbons, in the normal chain, such as methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof, and the like as well as such groups including 1 to 4 substituents such as halo, for example F, Br, Cl or I or $CF_3$, alkyl, alkoxy, aryl, aryloxy, aryl(aryl) or diaryl, arylalkyl, arylalkyloxy, alkenyl, alkynyl, cycloalkyl, cycloalkenyl, cycloalkylalkyl, cycloalkylalkyloxy, optionally substituted amino, hydroxy, hydroxyalkyl, acyl, alkanoyl, heteroaryl, heteroaryloxy, cycloheteroalkyl, arylheteroaryl, aryl alkoxycarbonyl, heteroarylalkyl, heteroarylalkoxy, aryloxyalkyl, aryloxyaryl, alkylamido, alkanoylamino, arylcarbonylamino, nitro, cyano, thiol, haloalkyl, trihaloalkyl and/or alkylthio.

The phrase "aryl" or prefix/suffix "aryl," and the like refers to monocyclic and bicyclic aromatic groups containing 6 to 10 carbons in the ring portion (such as phenyl or naphthyl including 1-naphthyl and 2-naphthyl) and may optionally include one to three additional rings fused to a carbocyclic ring or a heterocyclic ring (such as aryl, cycloalkyl, heteroaryl or cycloheteroalkyl rings) for example

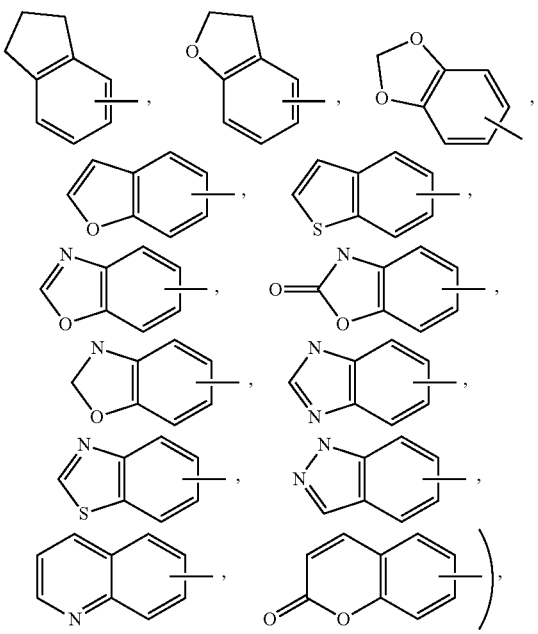

and may be optionally substituted through available carbon atoms with 1, 2, or 3 groups selected from hydrogen, halo, haloalkyl, alkyl, haloalkyl, alkoxy, haloalkoxy, alkenyl, trifluoromethyl, trifluoromethoxy, alkynyl, cycloalkyl-alkyl, cycloheteroalkyl, cycloheteroalkylalkyl, aryl, heteroaryl, arylalkyl, aryloxy, aryloxyalkyl, arylalkoxy, alkoxycarbonyl, arylcarbonyl, arylalkenyl, aminocarbonylaryl, arylthio, arylsulfinyl, aryl azo, heteroaryl alkyl, heteroarylalkenyl, heteroarylheteroaryl, heteroaryloxy, hydroxy, nitro, cyano, amino, substituted amino wherein the amino includes 1 or 2 substituents (which are alkyl, aryl or any of the other aryl compounds mentioned in the definitions), thiol, alkylthio, arylthio, heteroarylthio, arylthioalkyl, alkoxyarylthio, alkylcarbonyl, arylcarbonyl, alkyl aminocarbonyl, arylaminocarbonyl, alkoxycarbonyl, aminocarbonyl, alkylcarbonyloxy, arylcarbonyloxy, alkylcarbonylamino, arylcarbonylamino, arylsulfinyl, arylsulfinylalkyl, aryl sulfonyl amino, and arylsulfonaminocarbonyl and/or any of the alkyl substituents set out herein.

The phrase "cycloalkyl" or prefix "cycloalkyl-", and the like refers to saturated or partially unsaturated (containing 1 or 2 double bonds) cyclic hydrocarbon groups containing 1 to 3 rings, including monocyclicalkyl, bicyclicalkyl and tricyclicalkyl, containing a total of 3 to 20 carbons forming the rings, preferably 3 to 10 carbons, forming the ring and which may be fused to 1 or 2 aromatic rings as described for aryl, which include cyclopropyl, cyclobutyl, cyclopentyl, cyclohexyl, cycloheptyl, cyclooctyl, cyclodecyl and cyclododecyl, cyclohexenyl,

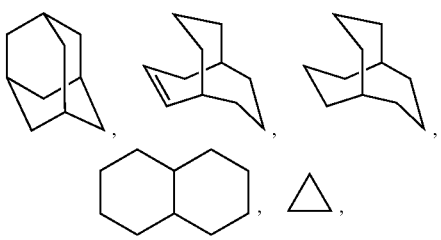

any of which groups may be optionally substituted with 1 to 4 substituents such as halogen, alkyl, alkoxy, hydroxy, aryl, aryloxy, arylalkyl, cycloalkyl, alkylamido, alkanoylamino, oxo, acyl, arylcarbonylamino, amino, nitro, cyano, thiol and/or alkylthio and/or any of the alkyl substituents.

The phrase "ambient and mild conditions" refers to temperature and/or pressure setting that are the same or similar to the surrounding environment or conditions that are moderate, easily acquired, and manageable.

The phrase "oligomer" or prefix "oligomer-", and the like refers to a molecular complex of chemicals that consists of a few monomer units, in contrast to a polymer, where the number of monomers is, in principle, infinite. https://en.wikipedia.org/wiki/Oligomer-cite_note-Goldbook-Oligomer-3 Dimers, trimers, and tetramers are, for instance, oligomers composed of two, three and four monomers, respectively.

Certain aspects of the present disclosure are directed to a metal catalyst represented by the following formula:

(Formula I)

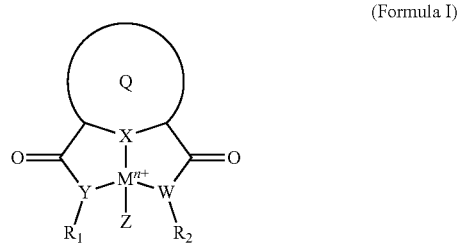

wherein
Q is a 5 or 6 membered aromatic ring;
W, X, and Y are the same or different, and are independently N, S, P, or O;
M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

In one aspect, the present disclosure are directed to the present disclosure are directed to a metal catalyst represented by the following formula:

(Formula II)

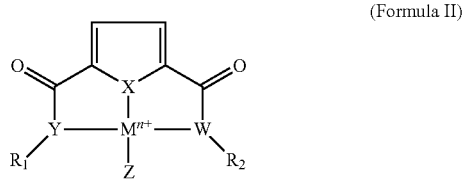

wherein
W, X, and Y are the same or different, and are independently N, S, P, or O;

M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

In one aspect, the present disclosure are directed to the present disclosure are directed to a metal catalyst represented by the following formula:

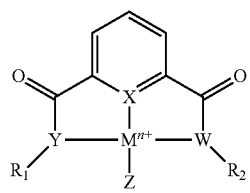

(Formula III)

wherein
W, X, and Y are the same or different, and are independently N, S, or P;
M is Ni, Pd, Fe, Co, Cr, Mn, Cu, Pt, Ir, or Ru;
Z is halide (F, Cl, Br, or I), acetate, water, or hydroxyl;
$R_1$ and $R_2$ are the same or different, and are independently alkyl, aryl, alkylaryl or cycloalkyl.

In certain embodiments, W, X, and Y in each of the Formula I, II, and III are the same. In certain embodiments, W, X, and Y are nitrogen (N).

In one aspect, the present disclosure are directed to the method for C—H bond activation and/or C—N coupling reaction using the metal catalyst represented by Formula I, II, or III. In certain embodiments, the reaction is performed under ambient and mild conditions. In certain embodiments, the reaction is performed without the presence of an oxidant or a base.

In certain embodiments, the present disclosure are directed to the method for C—H bond activation and/or C—N coupling reaction using the metal catalyst represented by Formula I, II, or III, and the C—N coupling reaction forms C—N bonds between a $sp^3$ carbon and a primary or secondary amine to form substituted or an alkylated amine. In certain embodiments, the $sp^3$ carbon is an aliphatic and aromatic hydrocarbon.

In certain embodiments, the present disclosure are directed to the method for C—H bond activation and/or C—N coupling reaction using the metal catalyst represented by Formula I, II, or III, and the C—N coupling reaction can be used to form aliphatic or aromatic amines using primary or secondary amines and form cyclic amine or oligomeric compound using aliphatic amines.

In one aspect, the present disclosure are directed to the method for C—H bond activation and/or C—N coupling reaction using the metal catalyst represented by Formula I, II, or III with the presence of an oxidant or a base. In certain embodiments, the oxidant and/or the base increase the yields of aliphatic and aromatic C—N coupling reaction. In certain embodiments, the oxidant can be selected from, for example, oxygen, hydrogen peroxide, t-butylhydroperoxide, peracetic acid, m-chloroperbenzoic acid, iodosylbenzene, phenyliododiacetate, iodine, sodium perborate, sodium hypochlorite, sodium persulfate, potassium persulfate, pyridine N-oxide, dibromoethane, manganese dioxide, cerium oxide, or sodium percarbonate, and combination thereof. In one particular embodiment, the metal is Zr. In another embodiment, the oxidant is pyridine N-oxide. In certain embodiments, the oxidant and/or the base increase the yields of aliphatic and aromatic C—N coupling reaction. In certain embodiments, the base can be selected from, for example, sodium carbonate, potassium carbonate, calcium carbonate, sodium tert-butoxide, potassium tert-butoxide, calcium tert-butoxide, sodium hydride, potassium hydride, or calcium hydride and combination thereof.

In one aspect, the amount of the metal catalyst represented by Formula I, II, or III in a reaction is not particular limited, for example, in the range of 0.0001-10 mol %. In one embodiment, the amount of the metal catalyst represented by Formula I, II, or III in a reaction is 0.02-2 mol %.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLES

The embodiments described above in addition to other embodiments can be further understood with reference to the following examples.

We have used metal catalysts (Scheme 1) for C—N bond formation. A catalyst loading of 0.2 mol % was used for our coupling reaction. This amount is almost 20-50 times less catalyst compared to that reported in the literature.

Scheme 1: General structure of catalysts used for this invention

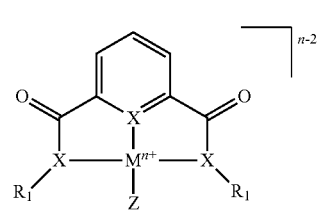

A

X: N, S, P
M: Ni, Pd, Fe, Co, Cr, Mn, Cu, Pt, Ir, Ru,
Z: halide, acetate, water, hydroxyl
$R_1$: any alkyl group, any aromatic

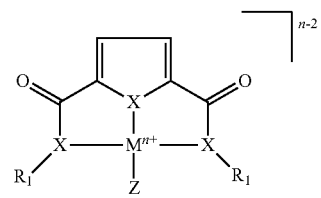

B

X: N, S, P, O
M: Ni, Pd, Fe, Co, Cr, Mn, Cu, Pt, Ir, Ru,
Z: halide, acetate, water, hydroxyl
$R_1$: any alkyl group, any aromatic We primarily used toluene for our reactions. We reacted toluene with different primary and secondary amines of both aliphatic and aromatic origins to yield different substituted and cyclic amines. Scheme 2A shows the general reaction of a hydrocarbon containing sp³ C—H bonds with a primary amine to produce both secondary and tertiary amine products using an amide-based metal catalyst. Scheme 2B shows a reaction scheme for a secondary amine reacting with hydrocarbons containing sp³ C—H bonds using an amide-based metal catalyst to obtain tertiary amine products. The scheme depicted in Scheme 2C shows the reaction of an aliphatic amine in the presence of the metal catalyst reacting with itself to form cyclic amines. These reactions were performed using both as a reactant and solvent without using any base or oxidant.

General Synthetic Procedure for C—N Coupling Reactions 2.000 mg of nickel(II) of amide-based ligand (0.00342 mmol) added to round bottom flask fitted with a stir bar and dissolved in 2.0 mL toluene under argon atmosphere for 20 min. Certain amount of strong base or an oxidant was added to the mixture. 0.16 mL (1.84 mmol) aniline was added to round bottom flask and allowed to react under reflux for 3 h. During the reaction, the color of the reaction mixture changes from the pale yellow to a dark orange solution. The solution was cooled to room temperature after 3 h. The reaction mixture was then passed through alumina to remove any catalyst residue. An aliquot of the reaction mixture was further diluted and injected into the GC-MS to determine the products formed. An internal standard (diphenylamine) was used to determine the turnover numbers (TONs) of the reaction.

Scheme 2: Different amine reactions using an amide-based metal catalyst

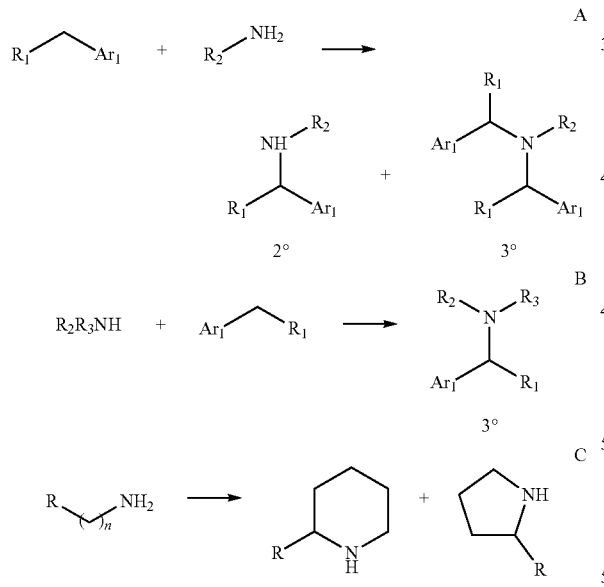

Different amine reactions using an amide-based metal catalyst are shown in Scheme 2, and a general reaction condition is shown in Scheme 3.

Scheme 3: General reaction using catalyst to synthesis secondary and tertiary amines

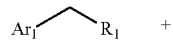

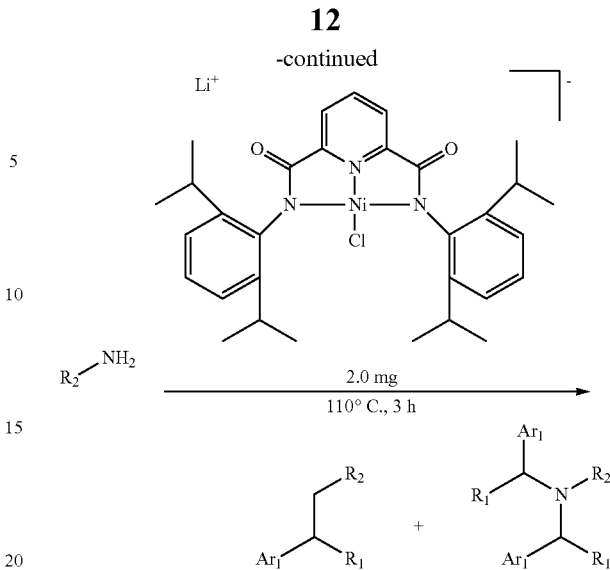

Table 1 shows the TONs of the products (2° amine) that were formed by the coupling reaction of different primary amines with toluene. Both aliphatic and aromatic amines were used for coupling reactions with toluene. As mentioned earlier, all the reactions were performed at 110° C. for 3 h. The reaction products were characterized using a GC-MS and the internal standard was used to determine the TONs. The reaction product is analyzed using GC-MS, and an exemplary chromatogram is illustrated in FIG. 1. As Table 1 indicates, a TON range of 46.7-314.0 was obtained for different amines. Octylamine yielded the highest TON for the reaction. Aniline yielded the lowest TON for this reaction. This may be due to the low nucleophilicity of the amine group. The amines (tert-butylamine, 2-tert-butylaniline, and sec-butylamine) yielded lower TON which could be a result of the high steric hindrance of the amines. We also noticed that the more substituted and aromatic compounds had, in general, lower TONs than the aliphatic amines.

TABLE 1

Primary amines reacted with toluene to produce secondary amines

| Entry | Substrate | Product (2° amine) | TON (2° amine) |
|---|---|---|---|
| 1 | Aniline | Benzylaniline | 46.7 ± 11.4 |
| 2 | Benzylamine | Dibenzylamine | 188.3 ± 96.3 |
| 3 | Tert-butylamine | (tert-butyl)benzylamine | 57.8 ± 11.2 |
| 4 | Methylbenzylamine | Benzyl-1-phenylethanamine | 251.3 ± 60.3 |
| 5 | Octylamine | Benzyl(octyl)amine | 314.0 ± 4.6 |
| 6 | 2-Tert-butylaniline | Benzyl-2-tert-butylaniline | 96.6 ± 22.1 |
| 7 | Hexylamine | Benzyl(hexyl)amine | 231.9 ± 75.1 |
| 8 | Sec-butylamine | Benzylbutan-2-amine | 53.1 ± 6.7 |

Table 2 shows TONs of products (3°) that were formed by the coupling reaction of different primary and secondary amines with toluene. All reactions were performed at 110° C. for 3 h. The reaction products were characterized using GC-MS and an internal standard was used to determine TONs. As Table 2 indicates, a TON range of 18.6-285.6 was obtained for different amines. Dibutylamine yielded the highest TON for the reaction. Diisopropylamine yielded the lowest TON for the reaction. It is possible that Diisopropylamine TON was lowest due to its high steric hindrance whereas both aniline and dibutylamine are not severely sterically hindered.

TABLE 2

Primary and secondary amines reacted with toluene to produce tertiary amines

| Entry | Substrate | Product | TON |
|---|---|---|---|
| 1 | Aniline | Dibenzylaniline | 207.5 ± 0.9 |
| 2 | Diispropylamine | Benzyldiisopropylamine | 18.6 ± 3.9 |
| 3 | Methylaniline | Benzylmethylaniline | 78.2 ± 21.4 |
| 4 | Dibutylamine | Benzyldibutylamine | 285.6 ± 0.6 |

Table 3 shows TONs of products (cyclic) that were formed by the coupling of different primary amines in the absence of toluene. All reactions were done at 110° C. for 3 h. The reaction products were characterized using GC-MS and an internal standard was used to determine TONs. As Table 3 indicates, a TON range of 72.2-342.9 was obtained for amines. Octylamine yielded the highest TON while sec-butylamine yielded the lowest TON. Sec-butylamine was the only primary amine used that was not aliphatic and this could be a leading factor on why the TON was much smaller than the other aliphatic amines. Also it was noticed that in the presence of toluene, cyclization was being highly favored over other products (2° and 3°).

TABLE 3

Primary amines reacted by themselves to produce cyclic products

| entry | substrate | product | TON |
|---|---|---|---|
| 1 | Hexylamine | 2,6-dimethylpiperdine | 110.9 ± 59.9 |
| 2 | Isoamylamine | 2-methylpiperdine | 490.8 |
| 3 | Amylamine | Piperdine | 126.5 ± 332.6 |
| 4 | Octylamine | Azonane | 342.9 ± 95.8 |
| 5 | Sec-butylamine | 2-methylpyrrolidine | 72.2 ± 30.2 |

Operation/Function/Use:

Forms C—X bonds by dehydrogenation of $sp^3$ carbons and amines and hydrogenation of ligands.

Alternatives:

Different metals (Ni, Pd, Fe, Co, Cr, Mn, Cu, Pt, Ir, Ru), different ligand bases (O, S, N, P), different substituent groups on ligand (different aromatics, different alkyl groups).

New Features:

A metal catalyst composes of various bases (O, S, N, P) and substituent groups (aromatic and alkyl groups) was employed towards C—H bond activation and C—N coupling reactions.

The metal catalyst (M=Cr, Mn, Fe, Co, Ni, Cu, Ru, Pd, Ir, Pt) described in any of the aspects or embodiments herein, was employed towards C—H bond activation and C—N coupling reactions.

Coupling of C—N bonds ($sp^3$ carbon) with primary and secondary amines to form substituted or alkylated amines were performed using the metal catalyst described in any of the aspects or embodiments herein. Both aliphatic and aromatic amines are used for coupling reactions. Aliphatic and aromatic hydrocarbons containing $sp^3$ C—H bonds were used for coupling reactions.

C—N bond formation was performed under ambient and mild conditions using the metal catalyst described in any of the aspects or embodiments herein without any oxidants or base.

Coupling of aliphatic amines with itself to form cyclic amines in the presence of the metal catalyst in any of the aspects or embodiments described herein was accomplished.

Coupling of primary amines with itself to obtain small, oligomeric compounds using the metal catalyst described in any of the aspects or embodiments herein was accomplished.

The metal catalyst described in any of the aspects or embodiments herein increases the yields of aliphatic and aromatic C—N bonds coupling of both primary and secondary amines in presence of a base (i.e. sodium carbonate, potassium carbonate, sodium hydroxide, potassium hydroxide, Lithium bis(trimethylsilyl)amide, potassium tert-butoxide, sodium hydride, potassium hydride, calcium hydride).

The metal catalyst described in any of the aspects or embodiments herein increases the yields of aliphatic and aromatic C—N bonds coupling of both primary and secondary amines in presence of an oxidant (e.g. pyridine N-oxide).

The metal catalyst described in any of the aspects or embodiments herein increases the yields of aliphatic and aromatic C—N bonds coupling of both primary and secondary amines in presence of an oxidant and base mentioned in Claims 7 and 8.

Commercial Applications:

Nitrogen-based compounds have great values in various fields ranging from fine chemicals to pharmaceuticals. In particular, aromatic nitrogen-based compounds have even more great value, extending to even more fields such as agrochemicals, electronica materials, xerography, pigmentation, and photography.

Competitive Advantages:

Reduce the need for additional materials such as base and oxidants, reduce extra steps required such as incorporation of additional groups ideal for directing C—N bond formation, and reduce the cost of catalyst.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above and claims set forth below are only intended to illustrate the principles of the present invention and are not intended to limit the scope of the invention to the disclosed elements.

What is claimed is:

1. A method for C—N coupling reaction comprising:
adding a hydrocarbon material to a container;
adding a metal catalyst to the container;
adding a primary or a secondary amine to the container,
using a metal catalyst to catalyze the C—N coupling reaction; wherein the metal catalyst represented by the following Formula II or Formula III:

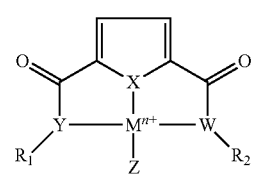

(Formula II)

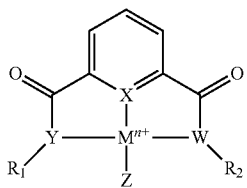

(Formula III)

wherein
W, X, and Y are N;
M is Ni, Pd, Fe, Co, Cr, Mn, Cu, Pt, Ir, or Ru;
Z is halide (F, Cl, Br, or I);
$R_1$ and $R_2$ are the same or different, and are independently alkyl, aryl, alkylaryl or cycloalkyl; and
n is 1, 2, or 3.

2. The method according to claim 1, wherein the C—N coupling reaction forms C—N bonds between a sp3 of the hydrocarbon and the primary or secondary amine to form substituted or an alkylated amine.

3. The method according to claim 2, wherein the primary or secondary amine is an aliphatic or aromatic amine.

4. The method according to claim 2, wherein sp3 carbon is an aliphatic and aromatic hydrocarbon.

5. The method according to claim 1, wherein the C—N coupling reaction is performed under ambient and mild conditions.

6. The method according to claim 1, wherein the C—N coupling reaction is performed without the presence of an oxidant or a base.

7. The method according to claim 1, wherein the C—N coupling reaction forms C—N bonds between aliphatic amines, to form a cyclic amine.

8. The method according to claim 1, wherein the C—N coupling reaction forms C—N bonds between primary amines, to obtain an oligomeric compound.

9. The method according to claim 1, wherein the amount of the metal catalyst is 0.02 to 2 mol % of sum of the hydrocarbon material and the amine material added.

* * * * *